Aug. 22, 1967  G. Z. MILOW  3,337,677
OVERHEAD POWER LINE TOWER HAVING AUXILIARY CROSS-ARM
Filed April 29, 1965
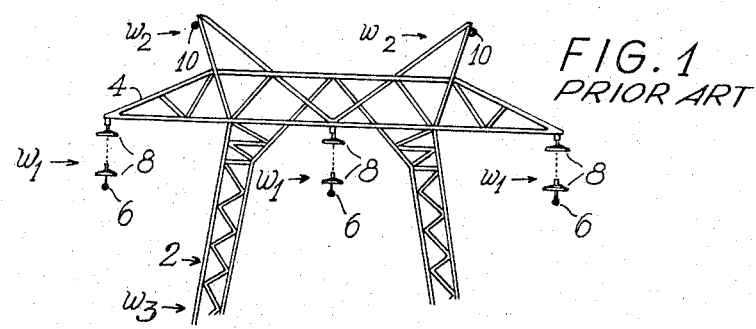
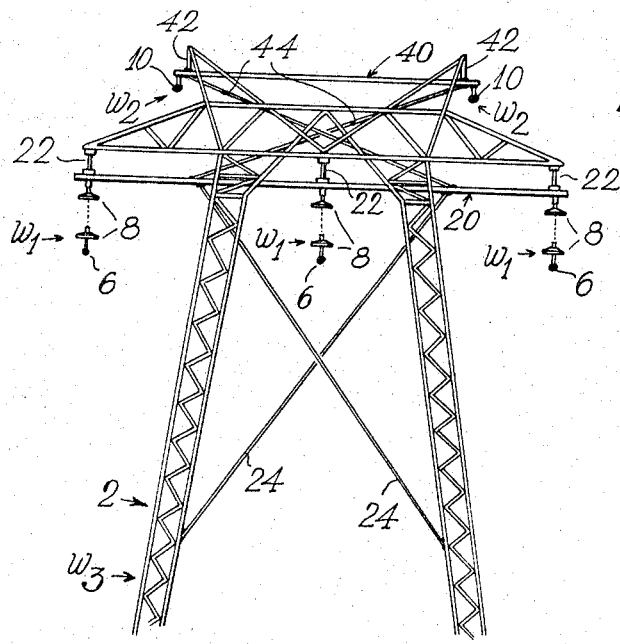
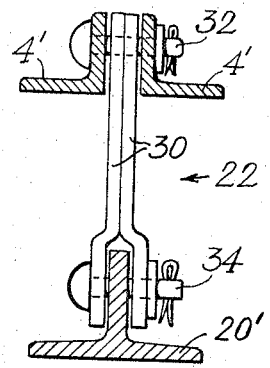
INVENTOR.
GARRY Z. MILOW

United States Patent Office 3,337,677
Patented Aug. 22, 1967

3,337,677
OVERHEAD POWER LINE TOWER HAVING AUXILIARY CROSS-ARM
Garry Z. Milow, 164 Modiin St., Givataim, Israel
Filed Apr. 29, 1965, Ser. No. 451,791
6 Claims. (Cl. 174—45)

ABSTRACT OF THE DISCLOSURE

An overhead power line tower for supporting an electrical conductor which tower includes an auxiliary cross-arm freely suspended from the tower in such manner as to enable the tower to withstand better the wind loads acting on the conductors. The auxiliary cross-arm is suspended at a plurality of horizontally spaced suspension points enabling the auxiliary cross-arm to move substantially in a linear path at right angles to the conductor. A plurality of stays are connected between the auxiliary cross-arm and a lower part of the tower for transferring to the latter the wind loads taken up by the auxiliary cross-arm. A second suspended auxiliary cross-arm is provided for the earth conductor.

---

The present invention relates to overhead power lines in which the electrical conductors, usually of considerable cross-section and mechanical strength, are suspended from towers or poles by means of insulators.

These towers must be constructed to withstand all the stresses to which they are subjected, including the weight of the conductors, hardware, insulator strings, snow, ice, etc., and the wind load acting on the conductors, etc. and on the tower.

The wind load acting on the conductors constitutes one of the main factors to be taken into account when designing towers. This wind load is actually larger than the weight of the conductors themselves.

An object of the present invention is to provide an arrangement, particularly for intermediate towers, for supporting the conductors of an overhead power line, which better enables the tower supporting the conductors to withstand the loads on the tower resulting from the wind pressure on the conductors.

To this end, the invention provides an overhead power line with an auxiliary cross-arm supporting the conductor and suspended from the tower at a plurality of horizontally spaced suspension points along the auxiliary cross-arm enabling it to move substantially in a linear path at right angles to the conductor. The auxiliary cross-arm includes a plurality of connections from it to the lower part of the tower for transferring thereto the wind loads taken up by the auxiliary cross-arm. In the described embodiment, these latter connections are in the form of stays.

Thus, the transverse forces acting on the tower because of the wind pressure will be transferred through the stays to a lower part of the tower, and the turning moments acting on the tower will be considerably decreased.

As described, the auxiliary cross-arm is suspended from the normal tower cross-arm. Preferably there is included another auxiliary cross-arm freely suspended from the tower and supporting the earth conductors, the latter auxiliary cross-arm being connected by a plurality of stays to the first mentioned one.

Further features and advantages of the invention will be apparent from the description below:

The invention is herein described with reference to the accompanying drawings which illustrate, by way of example only, one preferred embodiment of the invention. In the drawings:

FIG. 1 schematically illustrates one type of intermediate transmission tower or pole commonly used in overhead power lines;

FIG. 2 illustrates the present invention embodied in the type of tower of FIG. 1; and FIG. 3 illustrates one form of displaceable connection that may be used for supporting in suspension the auxiliary cross-arm of the present invention.

The tower illustrated in FIG. 1, generally designated 2 in the drawings, is one type of broad base tower commonly used for supporting overhead power lines. It includes its normal cross-arm 4 carrying the conductor 6, the latter being insulated from the tower by strings of insulators 8 between the conductors and the cross-arm. Earth wires 10 are supported at the top of the tower.

The normal tower cross-arm 4 is rigidly connected to the tower 2, and therefore transmits to the tower all the vertical loads, including the weight of the conductors, insulators, hardware, snow and ice. The cross-arm also transmits to the tower the transverse loads due to the wind pressure on the conductors and the other mentioned elements, causing a turning moment on the tower.

The transverse forces applied to the tower would therefore include a force W1, being the wind force applied to the conductors, etc. suspended from the cross-arm; force W2, being the wind force applied to the earth conductors 10; and force W3, being the wind force applied to the tower itself. All these forces produce a turning moment on the tower. As indicated earlier, the wind forces W1 and W2 acting on the conductors and earth wires, respectively, are a very substantial factor in designing the towers.

FIG. 2 illustrates the invention as embodied in the tower of FIG. 1.

According to the invention, an auxiliary cross-arm, generally designated 20, is freely suspended from the tower cross-arm. This auxiliary cross-arm in turn supports the conductors 6 and the insulator strings 8.

The auxiliary cross-arm 20 is supported from an upper part of tower 2 by means of a plurality of horizontally spaced displaceable connections 22 (see FIG. 3) between it and the normal tower cross-arm 4. Three such connections are shown in FIG. 2. Further connections are provided between auxiliary cross-arm 20 and lower parts of the tower. The latter connections are in the form of a plurality of stays 24, for example steel wires, extending from one side of the auxiliary cross-arm 20 to the base at the opposite side of the tower. The stays may terminate at the same level (as shown) or at different vertical levels of the tower. This arrangement permits the auxiliary cross-arm 20 to move substantially in a linear path at right angles to the conductor 6 and thus, through the stays 24, effectively transmits the transverse forces acting on the auxiliary cross-arm 20 to the lower part of the tower. This reduces the turning moments on the tower and enables the tower to withstand better these transverse forces.

FIG. 3 illustrates one form of arrangement that may be used for the displaceable connection 22 between the normal tower cross-arm 4 and the auxiliary cross-arm 20. In this arrangement, a pair of metal straps 30 are connected at their upper ends to the normal tower cross-arm 4, and at their lower ends to the auxiliary cross-arm 20. The tower cross-arm 4, in this case, may comprise a pair of steel angles 4' or U-irons between which the straps 30 are suspended by a fastener such as a bolt or pin 32.

The auxiliary cross-arm may comprise a T-shaped bar 20' attached between the two straps 30 by a fastener e.g. bolt or pin 34.

A similar arrangement may be used for supporting the earth conductors 10. In this case, a further auxiliary cross-arm 40 is suspended from the tower by means of displaceable connections 42, e.g. the same arrangement as illustrated in FIG. 3. For the other connections, that is those corresponding to stays 24 of auxiliary cross-arm 20, it is preferred to connect the auxiliary cross-arm 40 to cross-arm 20 rather than to the tower itself. The latter connections are accomplished by further stays 44 arranged to cross each other as stays 24, but connected to auxiliary cross-arm 20 rather than to the tower directly.

Thus, the wind load applied to the earth wires 10 will be transferred to the auxiliary cross-arm 20, which in turn will be distributed to the base of the tower as explained above with respect to the wind loads applied to the normal power lines.

An overhead power line constructed in accordance with this invention would also preferably use a releasable suspension device for supporting the conductors, such as described in my U.S. Patent No. 3,150,229.

It is to be understood that the described embodiment of the invention is illustrative only, and that many other embodiments, variations and applications of the invention, or the several features thereof disclosed, may be made without departing from the spirit or scope of the invention as defined in the following claims.

What I claim is:

1. An overhead power line support including a tower, an electrical conductor supported from an upper part thereof such that the upper part of the tower is normally subject to large loads produced by the wind pressure acting on the conductor, and means for enabling the tower to withstand better said loads comprising an auxiliary cross-arm supporting said conductor, suspension means suspending said auxiliary cross-arm from the tower, said suspension means engaging said auxiliary cross-arm at a plurality of horizontally spaced points therealong and enabling the auxiliary cross-arm to move substantially in a linear path at right angles to said conductor, and a plurality of connections from said auxiliary cross-arm to the lower part of the tower for transferring thereto the wind loads taken up by said auxiliary cross-arm.

2. An overhead power line as defined in claim 1, wherein said connections comprise a plurality of stays extending from said auxiliary cross-arm to a plurality of points at the lower part of the tower.

3. An overhead power line as defined in claim 1, wherein said tower includes a normal cross-arm rigidly attached thereto, said auxiliary cross-arm being suspended from said normal cross arm by at least one strap connected at its upper end to the normal tower cross-arm and at its lower end to the auxiliary cross arm.

4. An overhead power line as defined in claim 3, wherein the normal tower cross-arm comprises a pair of steel angles fastened together with the strap inbetween.

5. An overhead power line as defined in claim 3, wherein said auxiliary cross-arm is suspended at each suspension point by a pair of straps, the auxiliary cross-arm comprising a T-shaped bar fastened between each pair of straps.

6. An overhead power line as defined in claim 1, further including an earth conductor and another auxiliary cross-arm freely suspended from the tower and supporting the earth conductor, said another auxiliary cross-arm being connected by a plurality of stays to the first-mentioned auxiliary cross-arm.

References Cited

UNITED STATES PATENTS

| | | | |
|---|---|---|---|
| 1,885,317 | 11/1932 | Austin | 174—45 |
| 1,885,318 | 11/1932 | Austin | 174—45 |

LARAMIE E. ASKIN, *Primary Examiner.*